United States Patent
Prud'Homme et al.

(10) Patent No.: US 6,814,533 B1
(45) Date of Patent: Nov. 9, 2004

(54) LOOP CONVEYOR WITH AIR CUSHION TRANSFER

(76) Inventors: Hugo Prud'Homme, Promenade Paton 4480, Laval, Quebec (CA), H7W 5E1; Ivan Stecko, Parent 2330, Laval, Quebec (CA), H7E 1C5

( * ) Notice: Subject to any disclaimer, the term of this patent is extended or adjusted under 35 U.S.C. 154(b) by 0 days.

(21) Appl. No.: 10/720,152

(22) Filed: Nov. 25, 2003

(51) Int. Cl.[7] ............................................. B65G 35/00
(52) U.S. Cl. ............................. 414/676; 406/88; 406/77
(58) Field of Search ......................... 414/676; 406/86, 406/88, 77, 79, 82; 198/465.2

(56) References Cited

U.S. PATENT DOCUMENTS

| | | | | |
|---|---|---|---|---|
| 1,597,465 A | * | 8/1926 | Hepperle | 406/79 |
| 3,096,162 A | * | 7/1963 | Jepson | 34/502 |
| 3,614,168 A | * | 10/1971 | Range | 406/2 |
| 3,685,632 A | * | 8/1972 | Brady | 406/88 |
| 4,306,629 A | * | 12/1981 | Powell | 177/1 |
| 4,451,182 A | * | 5/1984 | Lenhart | 406/86 |
| 5,017,052 A | * | 5/1991 | Bartylla | 406/88 |
| 5,100,265 A | * | 3/1992 | Mirkin | 406/86 |
| 5,443,333 A | * | 8/1995 | Hilbish et al. | 406/88 |
| 6,630,633 B1 | * | 10/2003 | Uber et al. | 177/145 |

* cited by examiner

*Primary Examiner*—Richard Ridley
*Assistant Examiner*—W. Anthony
(74) *Attorney, Agent, or Firm*—Ogilvy Renault; Robert Mitchell

(57) ABSTRACT

A conveyor system comprises a transfer assembly bridging a pair of side-by-side belt conveyors adapted to move articles in opposite directions. The transfer assembly comprises an air table including an air plate adapted to be mounted between the side-by-side belt conveyors. The air table further includes an inner guide and an outer guide defining a curved track in which the articles are constrained to pass while being transferred from one belt conveyor to the other. The curved track extends at opposed ends thereof over the side-by-side belt conveyors to cause a reorientation of the articles while the articles are still on the belt conveyors.

19 Claims, 3 Drawing Sheets

LOOP CONVEYOR WITH AIR CUSHION TRANSFER

BACKGROUND OF THE INVENTION

1. Field of the Invention

The present invention relates to transfer assemblies between side-by-side conveyor runs.

2. Description of the Prior Art

It is well known to place a transfer assembly at one end of a first conveyor run for transferring articles from the first conveyor run to a second conveyor run extending in parallel to the first conveyor run. Such transfer assemblies typically transport the conveyed articles 90 degrees with respect to the parallel conveyor runs.

Conventional transfer assemblies comprise a push plate carried at the distal end of a reciprocating piston mounted at right angles to the conveyor runs. The piston is operated for successively pushing incoming articles from the delivery end of the first conveyor run to the adjacent entrance end of the second conveyor run. This type of transfer system has some limitations as to the rate at which articles can be transferred from one conveyor run to the other. Furthermore, such systems generally include actuators which are relatively complex in manufacture and operation requiring numerous movable parts which are subject to failure.

Rotary transfer assemblies are also known and typically include a rotary wheel mounted between two side-by-side conveyor runs. The articles are successively picked up from one conveyor run by the rotary wheel and transferred onto the other conveyor run as the wheel rotates. One drawback of that type of rotary system is that it contributes to increase the space between the side-by-side conveyor runs, thereby requiring more room to accommodate the overall conveyor system. Also, not perfectly well oriented articles are subject of becoming wedge between the rotary wheel and the conveyor runs.

There is thus a need for a new and simple transfer assembly which will provide for smooth transfer of articles between side-by-side conveyor runs.

SUMMARY OF THE INVENTION

It is therefore an aim of the present invention to provide a compact and simple transfer assembly between a pair of side by side conveyor runs.

It is also an aim of the present invention to facilitate the transfer of articles between side by side conveyor runs.

Therefore, in accordance with the present invention, there is provided a conveyor system comprising a transfer assembly bridging a pair of side-by-side belt conveyors adapted to move articles in opposite directions, said transfer assembly comprising an air table including an air plate adapted to be mounted between said side-by-side belt conveyors at a first end portion thereof, said air table further including an inner guide and an outer guide defining a curved track in which the articles are constrained to pass while being transferred from one belt conveyor to the other, and wherein said curved track extends at opposed ends thereof over said side-by-side belt conveyors to cause a reorientation of the articles while the articles are still on the belt conveyors.

In accordance with a further general aspect of the present invention, there is provided a conveyor system comprising an air table bridging a pair of side-by-side belt conveyors adapted to move articles in opposite directions, said air table comprising an inner guide and an outer guide bounding an upwardly facing channel extending along a curve between said side-by-side belt conveyors, wherein said channel extends at opposed ends thereof partly over said belt conveyors in order to initiate a reorientation of the articles on the belt conveyors as the articles are being transferred from one conveyor to the other via the air table.

In accordance with a further general aspect of the present invention, there is provided a loop conveyor comprising first and second side-by-side conveyor runs extending in parallel to each other, the first and second conveyor runs being driven to convey articles in opposite directions, first and second transfer assemblies provided at opposed ends of said first and second conveyor runs to transfer the articles from one conveyor run to the other, said first and second transfer assemblies defining with said first and second conveyor runs a loop circuit, each of said first and second transfer assemblies having a track defining a 180° bent, said track having a bottom surface and a pair of curved inner and outer guide walls extending from said bottom surface to form therewith an upward facing channel for guiding the articles along said 180° bent, wherein said bottom surface is perforated for providing for the formation of an air cushion underneath of the articles as the articles travel along said tracks.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
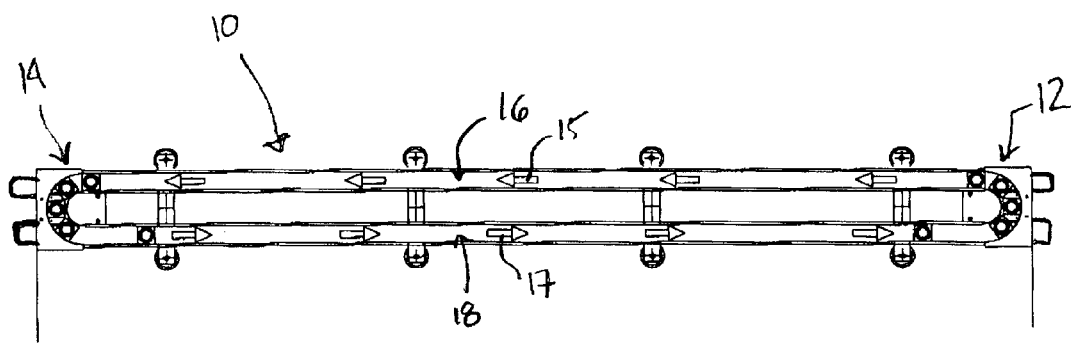
FIG. 1 is a schematic top plan view of a conveyor assembly comprising a pair of side by side belt conveyors connected together at opposed ends thereof by a pair of air tables in accordance with an embodiment of the present invention.
Figures 4A, 4B:
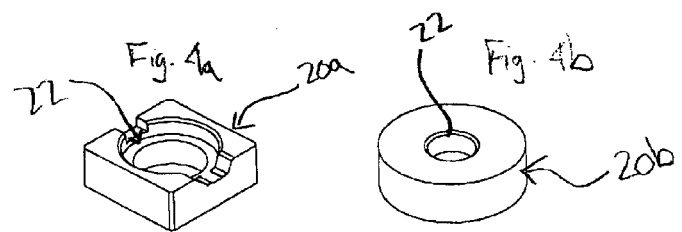
FIGS. 4a and 4b are perspective view of square and round article carrying pucks used with the conveyor assembly shown in FIG. 1.

FIG. 1 illustrates a loop conveyor 10 comprising a pair of air tables 12 and 14 bridging a pair of side-by-side belt conveyors 16 and 18 adapted to convey articles in opposite directions as depicted by arrows 15 and 17. A plurality of square pucks 20a (FIG. 4a) or round pucks 20b (FIG. 4b) are displaced along the loop circuit defined by the belt conveyors 16 and 18 and the air tables 12 and 14. Each puck 20a/20b defines a central recess or cavity 22 for receiving an article to be processed along the conveyor line.

The belt conveyors 16 and 18 are of conventional construction and will not be herein described in further details; suffice to say that the term "belt conveyor" is herein intended to mean any conventional conveyors having a movable article carrying surface.

Figure 2:
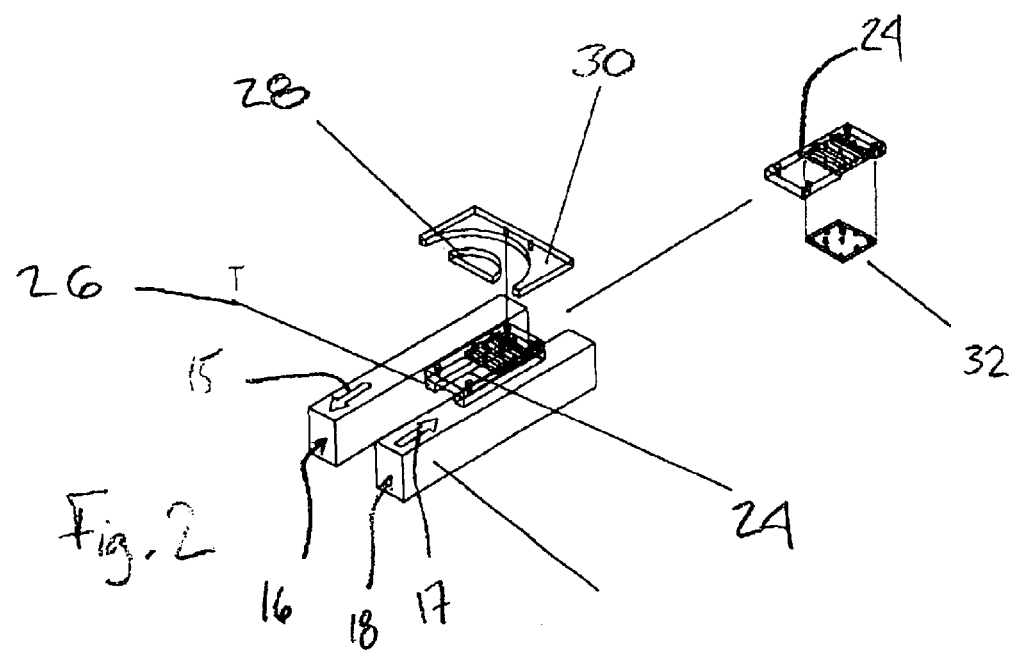
FIG. 2 is an exploded isometric view of one air table shown in FIG. 1.
Figure 3:
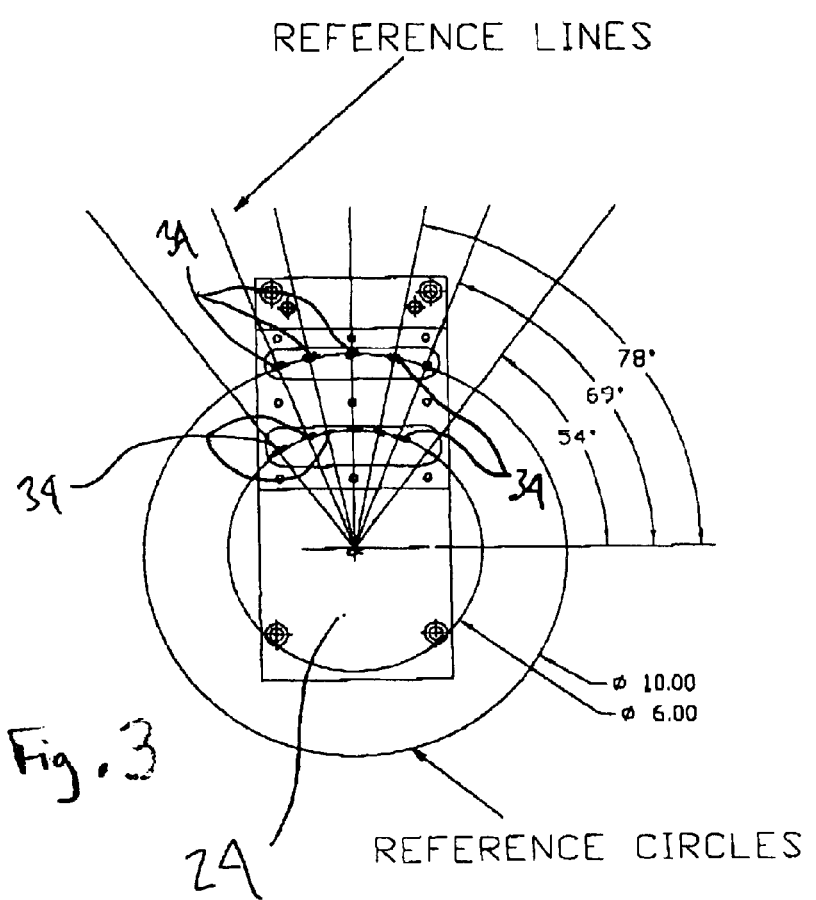
FIG. 3 is a top plan view of the air table illustrating the positions of the air jet holes in the top plate of the air table.

As shown in FIG. 2, each air table 12/14 generally comprises an air plate 24 mounted on appropriate supports 26 between the side-by-side belt conveyors 16 and 18. An inner guide 28 and an outer guide 30 are mounted on a top surface of the air plate 24 to cooperate therewith in defining an upwardly facing channel or track for guiding the pucks along a 180 degrees bent from a delivery end of one conveyor to the entrance end of the other conveyor.

According to a preferred embodiment of the present invention, an air tight bottom plate 32 is mounted underneath the air plate 24 to form therewith a plenum chamber connected to a source of pressurized air (not shown). A plurality of air jet holes 34 are defined in the air plate 24. The jet holes are inclined in the general direction of travel of the pucks 20a and 20b along the conveyor 10. The air jet holes 34 are preferably drilled on the tangent of two concentric reference circles perpendicular to radial reference lines at an angle of 30 degrees from the top surface of the air plate 24, thereby forming two circular arrays of holes between the inner and outer guides 28 and 30, the arrays being laterally offset relative to a central axis of the curved track. With this construction, air in the plenum chamber will impinge on the pucks 20a and 20b to move the pucks 20a and 20b forward over the air plate 24. The distribution of the air jet holes 34 on two concentric arcs of circle between the guides 28 and 30 ensures a smooth transition of the pucks 20a and 20b from the belt conveyors 16 and 18 to the air plate 24. This configuration of holes provides assistance in the reorientation of the pucks 20a and 20b as they negotiate the 180 degrees bent. According to a preferred embodiment of the present invention, the diameter of the air jet holes 34 is 0.04 inches.

As shown in FIG. 2, the inner guide 28 is provided in the form of a plate having a curved end surface for guiding the pucks at an inner radius of the track. The outer guide 30 is preferably provided in the form of a plate having a curved inner surface for guiding the pucks at an outer radius of the track. The outer guide 30 is mounted to the air plate 24 and positioned longitudinally inwardly of the adjacent terminal ends of the belt conveyors 16 and 18. As shown in FIGS. 1 and 2, the outer guide 30 extends at opposite ends thereof over the belt conveyors 16 and 18. The pucks 20a and 20b are thus still on the belt conveyors 16 and 18 while becoming engaged into and disengaged from the track. In this way, the reorientation of the pucks 20a and 20b is initiated and terminated on the belts conveyors 16a and 18. This contributes to minimize the risk of the pucks 20a and 20b becoming jammed in the bent between the conveyors 16 and 18.

The inner guide 28 and the outer guide 30 are removably fastened to the top surface of the air plate 24 as by screws. In this way, the guides 28 and 30 can be easily replaced when need be. The air plate 24 and the guides 28 and 30 can be made of Teflon or any other low friction material.

In operation, the pucks 20a and 20b are loaded with articles to be processed and placed on the belt conveyors 16 and 18. The pucks 20a and 20b on the belt conveyor 18 are moved forward in the direction illustrated by arrow 17 to the delivery end of the conveyor 18 where they become engaged in the track defined by the guides 28 and 30 of the air table 12. The guides 28 and 30 cause the incoming pucks 20a and 20b to be reoriented while the same are still being moved by the belt conveyor 18. The pucks 20a and 20b are then received on the air table 24 where they glide on an air cushion. The momentum of the pucks 20a and 20b as well as the pushing action of the air jets impinging the pucks 20a and 20b contribute to ensure a smooth and fast passage of the pucks 20a and 20b on the air table 24. At the opposite end of the track, the pucks 20a and 20b are received on the entrance end of the belt conveyor 16. The pucks 20a and 20b are then moved forward in the direction of arrow 15 to the delivery end of the conveyor 16. At the delivery end of the conveyor 16, the pucks 20a and 20b are transferred via the air table 14 back to the conveyor 18, as per the way described hereinabove with respect to the air table 12.

From the foregoing, it can be seen that the present invention provides a simple and reliable way of transferring articles between two side-by-side conveyors. The transfer system is compact and relatively inexpensive to built and operate. It is also advantageous in that it provides for a relatively fast and efficient transfer of the articles between the conveyors.

What is claimed is:

1. A conveyor system comprising a transfer assembly bridging a pair of side-by-side belt conveyors adapted to move articles in opposite directions, said transfer assembly comprising an air table including an air plate adapted to be mounted between said side-by-side belt conveyors at a first end portion thereof, said air table further including an inner guide and an outer guide defining a curved track in which the articles are constrained to pass while being transferred from one belt conveyor to the other, and wherein said curved track extends at opposed ends thereof over said side-by-side belt conveyors to cause a reorientation of the articles while the articles are still on the belt conveyors.

2. A conveyor system as defined in claim 1, wherein said first end portion of said side-by-side conveyors has a terminal end, and wherein said inner and outer guides are spaced longitudinally inwardly from said terminal end.

3. A conveyor system as defined in claim 1, wherein first and second arrays of air jet holes are defined in said air plate, the air jet holes of said first and second arrays being respectively distributed along first and second concentric arc of circles generally following a path traced by said curved track.

4. A conveyor system as defined in claim 3, wherein said air jet holes are inclined in a direction of travel of the articles.

5. A conveyor system as defined in claim 4, wherein said air jet holes form an angle of about 30 degrees with a top surface of the air table.

6. A conveyor system as defined in claim 1, wherein said inner guide is provided in the form of a plate secured on top of the air table, the plate having a rounded end for guiding the articles at an inner radius of the curved track.

7. A conveyor system as defined in claim 1, wherein said outer guide includes a plate secured on top of the air plate and having a curved inner surface for guiding the articles at an outer radius of the curved track.

8. A conveyor system as defined in claim 1, further comprising a plurality of pucks displaced by said belt conveyors and adapted to carry the articles to be processed, said pucks being sized to ride in said curved track.

9. A conveyor system comprising an air table bridging a pair of side-by-side belt conveyors adapted to move articles in opposite directions, said air table comprising an inner guide and an outer guide bounding an upwardly facing channel extending along a curve between said side-by-side belt conveyors, wherein said channel extends at opposed ends thereof partly over said belt conveyors in order to initiate a reorientation of the articles on the belt conveyors as the articles are being transferred from one conveyor to the other via the air table.

10. A conveyor system as defined in claim 9, wherein said air table comprises an air plate mounted in a free space between the belt conveyors, and wherein said outer guide is secured to said air plate and extends at opposite ends thereof over said side-by-side belt conveyors.

11. A conveyor system as defined in claim 10, wherein first and second arrays of air jet holes are defined in said air plate, the air jet holes of said first and second arrays being respectively distributed along first and second concentric arc of circles.

12. A conveyor system as defined in claim 11, wherein said air jet holes are inclined in a direction of travel of the articles, and wherein said air jet holes form an angle of about 30 degrees with a top surface of the air table.

13. A conveyor system as defined in claim 9, wherein said inner guide is provided in the form of a plate secured on top of the air table, the plate having a curved end defining a guiding surface for the articles as the articles travel on the air table.

14. A conveyor system as defined in claim 9, wherein said outer guide includes a plate secured on top of the air table and having a curved inner surface for guiding the articles at an outer radius of the channel.

15. A conveyor system as defined in claim 9, further comprising a plurality of pucks displaced by said belt conveyors and adapted to carry the articles to be processed, said pucks being sized to ride in said channel.

16. A loop conveyor comprising first and second side-by-side conveyor runs extending in parallel to each other, the first and second conveyor runs being driven to convey articles in opposite directions, first and second transfer assemblies provided at opposed ends of said first and second conveyor runs to transfer the articles from one conveyor run to the other, said first and second transfer assemblies defining with said first and second conveyor runs a loop circuit, each of said first and second transfer assemblies having a track defining a 180° bent, said track having a bottom surface and a pair of curved inner and outer guide walls extending from said bottom surface to form therewith an upward facing channel for guiding the articles along said 180° bent, wherein said bottom surface is perforated for providing for the formation of an air cushion underneath of the articles as the articles travel along said tracks.

17. A loop conveyor as defined in claim 16, wherein said first and second conveyor runs are belt conveyors.

18. A loop conveyor as defined in claim 16, wherein each of said first and second transfer assemblies comprises an air plate mounted in a free space between the conveyor runs, and wherein said outer guide walls forms part of an outer guide mounted to said air plate and extending at opposite ends thereof over said conveyor runs.

19. A loop conveyor as defined in claim 16, wherein first and second arrays of air jet holes are defined in said bottom surface, the air jet holes of said first and second arrays being respectively distributed along first and second concentric arc of circles.

\* \* \* \* \*